United States Patent
Hrle et al.

(10) Patent No.: US 11,263,235 B2
(45) Date of Patent: Mar. 1, 2022

(54) DATABASE MANAGEMENT SYSTEM AND METHOD OF OPERATION

(71) Applicant: International Business Machines Corporation, Armonk, NY (US)

(72) Inventors: Namik Hrle, Boeblingen (DE); Daniel Martin, Stuttgart (DE); Chandrasekaran Mohan, Saratoga, CA (US); James D. Spyker, Toronto (CA); Yongfeng Yao, Markham (CA)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 16/364,846

(22) Filed: Mar. 26, 2019

(65) Prior Publication Data
US 2019/0220467 A1 Jul. 18, 2019

Related U.S. Application Data

(62) Division of application No. 14/857,889, filed on Sep. 18, 2015, now Pat. No. 10,282,363.

(30) Foreign Application Priority Data

Oct. 21, 2014 (GB) ...................................... 1418665

(51) Int. Cl.
*G06F 16/27* (2019.01)
*G06F 16/23* (2019.01)
(Continued)

(52) U.S. Cl.
CPC ........ *G06F 16/273* (2019.01); *G06F 16/2358* (2019.01); *G06F 16/2379* (2019.01); *G06F 16/2455* (2019.01); *G06F 16/283* (2019.01)

(58) Field of Classification Search
None
See application file for complete search history.

(56) References Cited

U.S. PATENT DOCUMENTS 7,315,849 B2 1/2008 Bakalash
7,392,248 B2 6/2008 Bakalash
(Continued)

FOREIGN PATENT DOCUMENTS

EP 1610235 B1 11/2009
WO 2011144382 A1 11/2011

OTHER PUBLICATIONS

Pedone et al., Transaction reordering in replicated databases Oct. 24, 1997, Proceedings of SRDS '97: 16th IEEE Symposium on Reliable Distributed Systems.*
(Continued)

*Primary Examiner* — Jason G Liao
(74) *Attorney, Agent, or Firm* — Michael A. Petrocelli

(57) ABSTRACT

A computer-implemented method for operating a database management system which includes a source database and a target database. A database management system is configured for asynchronously replicating data changes of the source database to the target database. The database management system receiving a request to perform a database statement. The method can identify the most recently committed one of a plurality of transactions having been committed in the source database before the receiving of the request. Identifying repeatedly the one of the plurality of transactions having been replicated most recently to the target database. Execution of the requested statement in the target database is delayed until an evaluation of the repeatedly identified most recently replicated transaction returns that the identified most recently committed transaction has been replicated to the target database. After the delaying
(Continued)

execution, the method executes the requested statement in the target database.

8 Claims, 4 Drawing Sheets

(51) Int. Cl.
  *G06F 16/28* (2019.01)
  *G06F 16/2455* (2019.01)

(56) References Cited

U.S. PATENT DOCUMENTS

| | | | |
|---|---|---|---|
| 7,653,664 | B2 | 1/2010 | Chitre |
| 7,653,668 | B1 * | 1/2010 | Shelat ................ G06F 16/184 707/610 |
| 8,170,981 | B1 | 5/2012 | Tewksbary |
| 8,468,313 | B2 | 6/2013 | Yim |
| 8,650,150 | B2 | 2/2014 | Zhao |
| 8,650,340 | B2 | 2/2014 | Yan |
| 9,438,672 | B2 * | 9/2016 | Khemani ............ H04L 67/1095 |
| 2012/0215994 | A1 | 8/2012 | Burr |
| 2012/0290595 | A1 | 11/2012 | Kreindler |
| 2013/0073513 | A1 | 3/2013 | Kemper |
| 2013/0080386 | A1 | 3/2013 | Dwyer |
| 2013/0110764 | A1 | 5/2013 | Wilf |
| 2013/0145117 | A1 | 6/2013 | Wilkinson |
| 2013/0151467 | A1 | 6/2013 | Krishnan |
| 2013/0238556 | A1 | 9/2013 | Mielenhausen |
| 2014/0330767 | A1 * | 11/2014 | Fowler ................ G06F 16/288 707/607 |
| 2015/0379062 | A1 * | 12/2015 | Vermeulen .......... G06F 16/2358 707/691 |
| 2016/0110439 | A1 | 4/2016 | Hrle |
| 2018/0307721 | A1 * | 10/2018 | Vujic ................ G06F 16/2329 |

OTHER PUBLICATIONS

Moore, How are SQL Server Log Sequence Numbers (LSNs) generated? Mar. 7, 2018, stuart-moore.com, https://stuart-moore.com/how-are-sql-server-lsns-generated/.*
XML/SOAP Provisioning Interface Aug. 12, Tekelec, "910-6371-001 Revision B," pp. 1, 30.*
"Dell Latitude D600", Dell Inc., 2004, 2 pages, <https://www.dell.com/downloads/us/products/latit/d600_spec.pdf>.
Application No. GB1418665.4, filed on Oct. 21, 2014, entitled: "Database Management System and Method of Operation", pp. 1-53.
Atwood, Jeff, "Deadlocked!" Coding Horror, programming and human factors, Aug. 24, 2008, 10 pages, <https://blog.codinghorror.com/deadlocked/>.
Hrle, et al., "Database Management System and Method of Operation", U.S. Appl. No. 16/364,882, filed Mar. 26, 2019.
IBM, "DB2 Analytics Accelerator for z/OS", printed on Jun. 25, 2015, pp. 1-2, <http://www-03.ibm.com/software/products/en/db2analacceforzos/>.
IBM, "DB2 for Linux, UNIX and Windows", printed on Jun. 26, 2015, pp. 1-3, >http://www-01.ibm.com/software/data/db2/inux-unix-windows/db2-blu-acceleration/>.
IBM, "IBM DB2 Analytics Accelerator for z/OS, V4.1 together with related prerequisite hardware and prerequisite software, is a high-performance software offering that delivers fast analytic query responses", IBM United States Software Announcement 213-427, dated Oct. 1, 2013, pp. 1-11.
Kemper, et al., "HyPer: A Hybrid OLTP&OLAP Main memory Database System Based on Virtual Memory Snapshots", ICDE Conference 2011, pp. 195-206.
Larson et al., "Enhancements to SQL Server Column Stores", SIGMOD'13, Jun. 22-27, 2013, pp. 1-10.
List of IBM Patents or Patent Applications Treated as Related. Filed Mar. 26, 2019. 2 pages.
Martin et al., "Near Real-Time Analytics with IBM DB2 Analytics Accelerator", EDBT/ICDT '13, Mar. 18-22, 2013, pp. 1-10.
Mohan, IBM Research Fellow, printed on Sep. 16, 2015, pp. 1-14, <http://researcher.watson.ibm.com/researcher/view.php?person=us-cmohan>.
Pacerier, "Why use a Read Uncommitted isolation level?" stackoverflow.com, Dec. 14, 2019, 1 page, <https://stackoverflow.com/questions/2471055/why-use-a-read-uncommitted-isolation-level>.
Saffron, Sam, "Deadlocked" samsaffron.com, Aug. 27, 2008, 7 pages, <https://samsaffron.com/archive/2008/08/27/Deadlocked+>.
Sap Hana, "The Platform for Next-Generation Applications and Analytics", 2014, pp. 1-5, <http://hana.sap.com/abouthana.html>.
"Can", Dictionary.com, last printed Jul. 3, 2021, 10 pages, <https://www.dictionary.com/browse/can>.
"The Art of Indexing", Dynamic Information Systems Corporation, white paper, Oct. 1999, 34 pages.
UK Search Report, Application No. GB1418665.4, dated Apr. 21, 2015, pp. 1-3.

* cited by examiner

DATABASE MANAGEMENT SYSTEM AND METHOD OF OPERATION

BACKGROUND

The invention relates to computing systems, and more particularly to a database management system and a method for operating the same. Various types of database management systems (DBMS) exist which are usually optimized for performing some particular kinds of database queries efficiently. Said special-purpose DBMS may be able to efficiently process database queries of a first type but may be slow when processing database queries of another type because the table structure and indices of the database managed by the DBMS are not optimized for said other kind of queries. For example, an online analytical processing (OLAP) database may process OLAP queries efficiently, but not OLTP queries. An OLTP database may process OLTP queries efficiently, but not OLAP queries.

Some existing approaches (based e.g. on hybrid DBMSs) try to overcome said difficulties by storing the data redundantly in two different copies of the data to be queried. Each copy is stored in a database that is optimized for efficiently performing a particular kind of database query. A problem associated with said approach is that data changes applied in one of said copies need to be replicated to the other copy. Before said replication is successfully performed, said two copies are out of sync and may return different results in response to a database query. Data-synchronization protocols such as the "two-phase commit protocol" (2PC) coordinate all the processes that participate in a decision on whether and when to replicate a transaction that has already been performed in one of said two copies to the other copy. The replication shall ensure data consistency of the two copies. However, said 2PC protocols are "heavy-weight" because synchronous round-trips for keeping the two data copies in sync generate a significant computational overhead.

SUMMARY

In an aspect according to the invention, a computer-implemented method for operating a database management system, includes a source database and a target database. A database management system is configured for asynchronously replicating data changes of the source database to the target database. The database management system includes: receiving a request to perform a statement, the statement being a database statement; identifying the most recently committed one of a plurality of transactions having been committed in the source database before the receiving of the request; repeatedly identifying the one of the plurality of transactions having been replicated most recently to the target database; delaying execution of the requested statement in the target database until an evaluation of the repeatedly identified most recently replicated transaction returns that the identified most recently committed transaction has been replicated to the target database; and after the delaying execution, executing the requested statement in the target database.

In another aspect according to the present invention, a computer program product for operating a database management system (DBMS), includes the database management system comprising a source database and a target database and is configured for asynchronously replicating data changes of the source database to the target database. The computer program product including a computer readable storage medium having program instructions embodied therewith, and the computer readable storage medium is not a transitory signal per se. The program instructions are executable by a computer to cause the computer to perform a method, including: the DBMS receiving a request to perform a statement, the requested statement being a database read statement; the DBMS identifying a requested transaction to which the requested statement belongs; the identifying the most recently committed one of a plurality of transactions having been committed in the source database before receiving the request; the DBMS delaying execution of the requested statement in the target database until the identified most recently committed transaction has been replicated to the target database; after the delaying, the DBMS transferring all uncommitted data changes having been imposed by all statements, preceding the requested statement and being contained in the identified requested transaction from the source database to the target database; and applying the transferred changes also on the target database; the DBMS executing the requested statement on the target database, thereby reading data from the target database, the read data also comprising at least some of the transferred data changes; the DBMS returning the read data; and after returning the read data, the DBMS undoing the applied data changes in the target database which have been imposed by the preceding statements.

In another aspect according to the present invention, a database management system includes a source database; a target database, and a database management computer system for operating a database management system. The computer system including one or more computer processors, one or more computer-readable storage media, and program instructions stored on one or more of the computer-readable storage media for execution by at least one of the one or more processors. The program instructions are configured for: asynchronously replicating data changes of the source database to the target database; receiving a request to perform a statement, the statement being a database statement; identifying the most recently committed one of a plurality of transactions having been committed in the source database before the receiving of the request; repeatedly identifying the one of the plurality of transactions having been replicated most recently to the target database; delaying execution of the requested statement in the target database until an evaluation of the repeatedly identified most recently replicated transaction returns that the identified most recently committed transaction has been replicated to the target database; and after the delaying, executing the requested statement in the target database.

In another aspect according to the present invention, a method for operating a database management system includes: a source database and a target database; a database management system being configured for asynchronously replicating data changes of the source database to the target database, the database management system: receiving a request to perform a statement, the statement being a database statement; identifying the most recently committed one of a plurality of transactions having been committed in the source database before the receiving of the request; repeatedly identifying the one of the plurality of transactions having been replicated most recently to the target database; delaying execution of the requested statement in the target database until an evaluation of the repeatedly identified most recently replicated transaction returns that the identified most recently committed transaction has been replicated to the target database; after the delaying execution, executing the requested statement in the target database.

In a related aspect, the method includes the source database assigning a source log and the target database assigns a target log; the identification of the most recently committed transaction comprises analyzing the source log, the source log comprising source commit log sequence numbers (LSN) respectively indicating a commit event of one of the plurality of committed transactions; the repeated identification of the most recently replicated transaction comprises repeatedly analyzing the target log, the target log comprising replication commit log sequence numbers respectively indicating a moment when one of the transactions having committed in the source database were replicated to the target database; and the evaluation of the repeatedly identified most recently replicated transaction comprises comparing the source commit log sequence numbers of the identified most recently committed transaction with the repeatedly identified replication commit log sequence numbers.

In a related aspect, the method includes the structure of the source database being optimized for a first type of database queries, the structure of the target database is optimized for a second type of database queries, the second type differing from the first type of queries, and wherein receiving the requested statement is performed by the database management system receiving a request for executing a transaction, the transaction comprising the requested statement and optionally one or more further statements; the method further comprising, for each of the statements in the transaction: the database management system evaluating the statement for determining if said statement specifies a database query of the first type or of the second type; when the statement is determined to be of the first type, the database management system dispatching the statement for execution to the source database, skipping the delay step and immediately executing the requested statement in the source database; and when the statement is determined to be of the second type, the database management system dispatching the statement for execution to the target database and performing the delaying and the delayed execution of the statement in the target database, and wherein the requested statement is determined to be of the second type and is dispatched to the target database.

In a related aspect, the method includes the source database is an OLTP database and the first type of database queries include INSERT statements, UPDATE statements, DELETE statements and/or index-based SELECT statements; and wherein the target database is an OLAP database and the second type of queries include SELECT statements that execute a non-index based sequential table-scan.

In a related aspect, the method includes the database management system comprises a first database engine configured for executing the first type of database queries on the source database; the database management system comprises a second database engine configured for executing the second type of database queries on the target database; and the method further comprising: dynamically, and transparently to a client program, executing the requested statement either by the first database engine on data of the source database or by the second database engine on data of the target database in dependence on the type of the received statement.

In a related aspect, the method includes the delaying implemented by: upon the database management system deciding to dispatch the requested statement to the target database engine, the database management system performing the identifying of the current source commit log sequence number of the identified most recently committed transaction and assigning a transaction-ID of the transaction comprising the requested statement to said identified current source commit log sequence number; supplementing the request for the statement with the transaction-ID of the transaction comprising said statement and with the identified current source commit log sequence number; the second database engine queuing the request until the determining that the identified most recently committed transaction was replicated to the target database.

In a related aspect, the method includes determining if the requested statement is of the first or of the second database query type; the database management system supplementing the received request with the identified most current replication commit log sequence number and forwarding the supplemented request to the second database engine only in case the requested statement is determined to be of the second type.

In a related aspect, the method includes the source log comprising a plurality of source commit log sequence numbers, each source commit log sequence number having assigned a transaction-ID of the one of the transactions that committed at a source log record identified by said source commit log sequence number; wherein the target log comprises a plurality of replication commit log sequence numbers, each replication commit log sequence number having assigned a transaction-ID of the one of the transactions that was successfully replicated to the target database at a target log record identified by said replication commit log sequence number; wherein the determining if the identified most recently committed transaction has been replicated to the target database comprises: the second database engine receiving the identified current source commit log sequence number from the first database engine; and the second database engine repeatedly searching the target log for identifying the transaction-ID assigned to the identified current source commit log sequence number in the target log; or the first database engine repeatedly receiving the identified most current replication commit log sequence number from the second database engine and comparing the transaction-ID assigned to said received most current replication commit log sequence number with the transaction-ID assigned to the identified current source commit log sequence number; the second database engine executing the delay until the searching or the comparing identifies a matching pair of transaction-IDs.

In a related aspect, the method includes the order of the commit log sequence numbers in the source log reflects the chronological order of commit events of the transactions in the source database; wherein the order of the replication commit log sequence numbers in the target log reflects the chronological order of committed replication events of the transactions in the target database; and wherein the asynchronously replicating of the transactions having committed in the source database is executed in accordance with the order of the commit log sequence numbers of the source log.

In a related aspect, the method includes the database management system executes the replication of the data changes in a batch-wise manner by: compiling a batch, the batch comprising statements of one or more transactions that have been executed in the source database and have not yet been replicated to the target database, each of said one or more transactions corresponding to one of the source commit log sequence numbers; grouping the statements of the batch into one or more commit groups, wherein all statements contained in any of the commit groups belong to the same transaction having already committed in the source database, wherein said commit groups are free of statements of non-committed transactions; replicating the batch, thereby executing and committing all transactions in the one or more commit groups of the batch also in the target database in a single step; upon having successfully replicated the batch, identifying the one transaction of a plurality of transactions in said batch that was replicated most recently to the target database; and using a log sequence number $LSN_B$ of one of the target log's log records that represents the moment of the successful replication of said identified transaction as the most current replication commit log sequence number; repeating steps a)-d) zero, one or multiple times, thereby respectively updating the current replication commit log sequence number.

In a related aspect, the method further comprises if at the moment of receiving the request the identified current source commit log sequence number has associated an identifier of a transaction that was not yet replicated to the target database, immediately executing steps a)-d) after receiving the request.

In a related aspect, the method further comprises evaluating the source log in combination with the replication commit log sequence number of the repeatedly identified most current replicated one of the transactions for determining if any data changes are currently contained in the source database that have not yet been replicated to the target database; and in case the source database does not comprise said non-replicated changes, skipping the delay step and automatically executing the requested statement in the target database.

In a related aspect, the method further comprises the database management system receiving and evaluating a parameter value; in case said parameter value indicates that a client application having submitted the request requires to receive a result that reflects a state of the source database at a moment in time which is identical to or is more recent than the moment of receiving the request, executing the delaying; and otherwise, skipping the delaying.

In a related aspect, the method further comprises identifying a requested transaction to which the requested statement belongs; after the delaying, executing statements preceding the requested statement and being contained in the identified requested transaction, the execution of the preceding statements and of the requested statement being performed in the target database in chronological order of said statements within the requested transaction, wherein executing the requested statement comprises reading data from the target database, the read data also comprising changes imposed by the preceding statements; returning the read data; and after returning the read data, undoing the data changes in the target database imposed by the preceding statements.

In another aspect according to the present invention, a computer program product for operating a database management system (DBMS) includes, the database management system comprising a source database and a target database and is configured for asynchronously replicating data changes of the source database to the target database, the computer program product comprising a computer readable storage medium having program instructions embodied therewith, wherein the computer readable storage medium is not a transitory signal per se, the program instructions executable by a computer to cause the computer to perform a method, comprising: the DBMS receiving a request to perform a statement, the requested statement being a database read statement; the DBMS identifying a requested transaction to which the requested statement belongs; the identifying the most recently committed one of a plurality of transactions having been committed in the source database before receiving the request; the DBMS delaying execution of the requested statement in the target database until the identified most recently committed transaction has been replicated to the target database; after the delaying, the DBMS transferring all uncommitted data changes having been imposed by all statements, preceding the requested statement and being contained in the identified requested transaction from the source database to the target database; and applying the transferred changes also on the target database; the DBMS executing the requested statement on the target database, thereby reading data from the target database, the read data also comprising at least some of the transferred data changes; the DBMS returning the read data; after returning the read data, the DBMS undoing the applied data changes in the target database which have been imposed by the preceding statements.

In a related aspect, the method of claim 15 includes the source database assigns a source log and the target database assigns a target log; the identification of the most recently committed transaction comprises analyzing the source log, the source log comprising source commit log sequence numbers (LSN) respectively indicating a commit event of one of the plurality of committed transactions;

the repeated identification of the most recently replicated transaction comprises repeatedly analyzing the target log, the target log comprising replication commit log sequence numbers respectively indicating a moment when one of the transactions having committed in the source database were replicated to the target database; and the evaluation of the repeatedly identified most recently replicated transaction comprises comparing the source commit log sequence numbers of the identified most recently committed transaction with the repeatedly identified replication commit log sequence numbers.

In a related aspect, the method includes the structure of the source database is optimized for a first type of database queries, the structure of the target database is optimized for a second type of database queries, the second type differing from the first type of queries, and wherein receiving the requested statement is performed by the database management system receiving a request for executing a transaction, the transaction comprising the requested statement and optionally one or more further statements; the method further comprising, for each of the statements in the transaction: the database management system evaluating the statement for determining if said statement specifies a database query of the first type or of the second type; when the statement is determined to be of the first type, the database management system dispatching the statement for execution to the source database, skipping the delay step and immediately executing the requested statement in the source database; when the statement is determined to be of the second type, the database management system dispatching the statement for execution to the target database and performing the delaying and the delayed execution of the statement in the target database, wherein the requested statement is determined to be of the second type and is dispatched to the target database.

In a related aspect, the method includes the source database is an OLTP database and the first type of database queries include INSERT statements, UPDATE statements, DELETE statements and/or index-based SELECT statements; and wherein the target database is an OLAP database and the second type of queries include SELECT statements that execute a non-index based sequential table-scan.

In a related aspect, the method includes the database management system comprises a first database engine configured for executing the first type of database queries on the source database; the database management system comprises a second database engine configured for executing the second type of database queries on the target database; and the method further comprising: dynamically, and transparently to a client program, executing the requested statement either by the first database engine on data of the source database or by the second database engine on data of the target database in dependence on the type of the received statement.

In another aspect according to the present invention, a database management system includes: a source database; a target database; and a database management computer system for operating a database management system, the computer system comprising: one or more computer processors, one or more computer-readable storage media, and program instructions stored on one or more of the computer-readable storage media for execution by at least one of the one or more processors, the program instructions being configured for: asynchronously replicating data changes of the source database to the target database; receiving a request to perform a statement, the statement being a database statement; identifying the most recently committed one of a plurality of transactions having been committed in the source database before the receiving of the request; repeatedly identifying the one of the plurality of transactions having been replicated most recently to the target database; delaying execution of the requested statement in the target database until an evaluation of the repeatedly identified most recently replicated transaction returns that the identified most recently committed transaction has been replicated to the target database; and after the delaying, executing the requested statement in the target database.

BRIEF DESCRIPTION OF THE DRAWINGS

In the following, preferred embodiments of the invention will be described in greater detail by way of example only, thereby making reference to the drawings in which.

DETAILED DESCRIPTION

Figure 1:
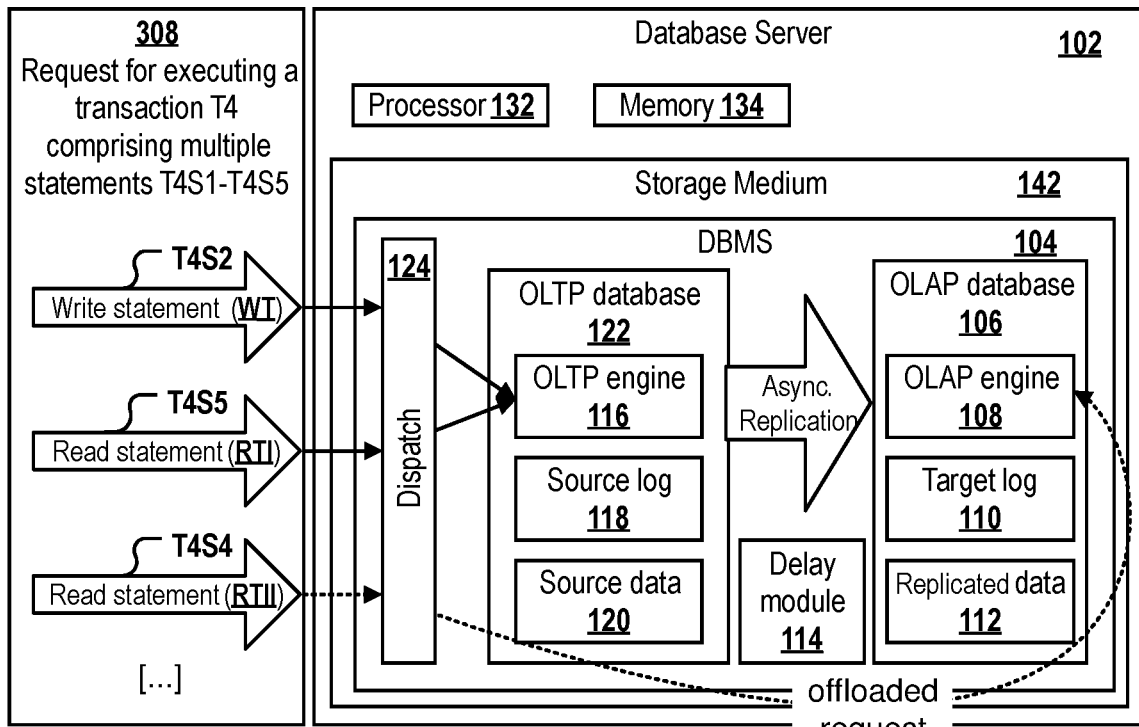
FIG. 1 illustrates a DBMS comprising a source and a target database configured to processes a request.

In the following, like numbered elements in the figures either designate similar elements or designate elements that perform an equivalent function. Elements which have been discussed previously will not necessarily be discussed in later figures if the function is equivalent.

A "database" as used herein is a collection of electronic information that is organized in memory or on a non-volatile storage volume in the form of a particular, defined data structure which supports or is optimized for data retrieval by a particular type of database query.

A database may be organized in tables or columns or other forms of data structures to provide efficient retrieval. An individual table may act as database. In conventional databases, all tables of the database have the same structure in respect to the physical organization of the data in the memory or on a non-volatile storage medium. For example, some row-oriented databases may comprise multiple tables which organize their data in a row-oriented manner. Some column-oriented databases may solely comprise tables which organize their data in a column-oriented manner. In said cases, the database and all its tables may structurally be optimized for a particular type of database query.

There exist also some DBMS which store data redundantly in different data structures that support different kinds of database queries. For example, some DBMS, when storing some data in a row-oriented manner, automatically create a copy of said data and store the copy in a column-oriented manner. The DBMS may hide the two different data structures comprising the two data copies and being optimized for different kinds of database queries from the user: the DBMS may "present" only a single "virtual table" at which database queries may be directed and automatically dispatches the database queries to the one of the two data structures which is optimized for processing said kind of query. Although said kind of DBMS present only a single "virtual table" to the user or client application programs, in fact said DBMS comprise two different database tables whose structure is optimized for different kinds of database queries. Said two different kinds of database tables (e.g. a data container organized in row-major order and a data container organized in column-major order), although represented by a single "virtual table", will in the following be considered as two databases optimized for different kinds of database queries which may respectively act as source database or as target database. Thus, according to the above definition, a "virtual database table" that dispatches database queries to one of a plurality of different data structures optimized respectively for different kinds of database queries is thus, according to the above definition, not a 'database' in the sense of the invention. Rather, each of said plurality of different data structures would respectively resemble a "database" as used herein.

A "database management system" (DBMSs) is a software and/or hardware based system that is designed to allow the definition, creation, querying, updating and administration of one or more databases. Typically, a DBMS is operable to interact with a user, with other applications, and one or more databases managed by the DBMS to process some requests and to analyze data. Well-known DBMSs include MySQL, MariaDB, PostgreSQL, SQLite, Microsoft SQL Server, Microsoft Access, Oracle, SAP HANA, dBASE, FoxPro, IBM DB2, and others.

The term "statement" as used herein refers to a Structured Query Language (SQL) statement, which performs a write operation (INSERT, UPDATE or DELETE) in a database or a read operation (SELECT) to read data from the database. The read data may have the form of a result set, i.e., a logical set of columns and rows of data returned by executing a read statement.

A "transaction" or "database transaction" is a logical unit of database operations which are executed as a whole to process user requests for retrieving data. A transaction is a larger unit that comprises and frames one or more statements. A transaction ensures that the action of the framed statements is atomic with respect to recovery.

The term "log" as used herein refers to a data structure acting as a container for information on all statements and transactions having been performed on a particular database. Depending on the embodiment, the log may comprise information being sufficient for recovering the contents of the database, and may also comprise information for statistics, traces, or performance evaluation. A 'log' may be implemented as electronic document, e.g. a text file, a binary file or a set of database records. A single physical data structure (file, set of database records, etc.) may comprise the logs of multiple databases.

A log comprises "log records". A "log record" is a single atomic record of activity within the SQL engine operating on the logged database. Each "log record" has its log sequence number ("LSN"). An LSN is a DBMS-wide identifier that uniquely identifies a log record. An LSN may be considered as a logical clock of the log. For example, an LSN may indicate the number of bytes written to log from the log creation to the certain log record. The LSN of a log record is like a timestamp of said record because it uniquely identifies a record that starts at a particular point in the continuing log. For example, the LSN may be a hexadecimal value derived from a clock timestamp. The term "data consistency" of two databases as used herein implies that a particular request will return an identical result or almost identical result irrespective of the database used for processing the request.

Replicating Committed Changes

The above mentioned features may significantly increase the performance of query execution: the structure of the target database may be optimized for executing the requested type of transaction quickly (or at least faster than the source database). It may also be possible to host the target database and the source database on different servers and dynamically decide which kind of server and corresponding database shall be used for processing a query in dependence on the current load of the server, the type of the query or the type of client having submitted the query. The requested transaction may per default or after an analysis of the type of requested statement be dispatched for execution to the target database. All data changes of the source database may be propagated by an asynchronous replication mechanism to the target database. Thus, executing an individual statement after the above specified delay period in the target database may allow using multiple databases and/or database servers for increasing performance of query execution (e.g. by providing hardware or data abundantly or by optimizing the database structure for different purposes). When executing a statement in the target database, said statement will "see" all data changes having been imposed by transactions which already committed in the source database before the request was received. Thus, query performance may be increased while a maximum level of data consistency may be achieved.

However, there may be no guarantee that the data of the target database is absolutely in sync with the source database when the requested transaction is executed on the target database: the requested statement may be part of a requested transaction that comprises multiple statements including some write statements that precede the requested statements. Any changes imposed by one of said preceding write statements on the source database may not have been replicated to the target database at the moment when the requested statement is executed in the target database because only transactions that have been committed in the source database are replicated to the target database and the requested transaction may not have been committed. Thus, when executing the requested statement in the target database, said 'uncommitted' changes may be missed and the result that is returned from the target database may slightly deviate from the result obtained from the source database. However, it has been determined that in many cases, the tremendous gain in performance by far outweighs the reduced level of data consistency. By delaying the execution until the already committed transactions were replicated to the target database, but not until the whole requested transaction comprising the requested statement commits in the source database, the delay time is comparatively short and predictable and may depend on the replication system used. Thus, the total delay time may be comparatively small compared to the gain in performance by executing the requested statement on the target database and by not waiting until the requested transaction committed in the source database. Thus, the query execution time may greatly be reduced and the data consistency may only be reduced to a small degree, if at all.

According to some embodiments, the structure of the source database is optimized for a first type of database queries and the structure of the target database is optimized for a second type of database queries. The second type of queries differs from the first type of queries.

According to embodiments, receiving the requested statement may comprise the DBMS receiving a request for executing a transaction, whereby said transaction comprises the requested statement. The transaction, that may also be referred to as 'requested transaction' may optionally comprise one or more further statements. The further statements may precede and/or succeed the requested statement. The method may further comprise, for each of the statements in said requested transaction:

the DBMS evaluating the statement for determining if said statement specifies a database query of the first type or of the second type;

in case said statement is determined to be of the first type, the DBMS dispatching the statement for execution to the source database, skipping the delay step and immediately executing the requested statement in the source database;

in case said statement is determined to be of the second type, the DBMS dispatching the statement for execution to the target database and performing the delaying and the delayed execution of the statement in the target database.

This may accelerate the execution of a request: if a particular statement can be performed faster or at least equally fast in the source database, the statement is executed without any delay in the source database. Only in case said statement is of a database query type that can be processed faster on the target database, the execution of the requested statement is delayed. The delay will, however, almost always be shorter than the time gained by an improved performance of the request on the target database.

The source log of a source database and the target log of a target database may be implemented as a single data structure comprising both logs. Alternatively, they may be implemented as two separate data structures. A DBMS may repeatedly update the source log for logging data changes applied in the source database and may update the target log for logging data changes applied in the target database. According to some embodiments, the source database and/or the target database are distributed over multiple server computers respectively comprising parts of the source log or target log. Said various parts of the source log and target log respectively comprise LSNs that are uniquely identifiable, e.g. are values derived from a shared clock. In DB2 for z/OS the sysplex timer may be used as the shared clock. A sysplex timer is a hardware device that synchronizes the time-of-day clocks of multiple CPUs. When multiple CPUs update the same database, and database reconstruction is necessary, all updates may be time-stamped by the sysplex timer in proper sequence. Thus, embodiments of the invention may be implemented also in shared disk architectures and shared data OLTP system clusters (e.g. DB2 for z/OS in data-sharing mode). According to embodiments, the source log and the target log are generated by using the write-ahead logging (WAL) technique. All modifications are written to a log before they are applied. Usually both redo and undo information is stored in the source log and in the target log.

According to embodiments, execution of the requested statement in the target database is not delayed until any statements that precede the requested statement have been replicated to the target database. In other words, the replication of said preceding statements to the target database is not awaited. Rather, the delaying may be immediately terminated upon determining that the identified most recently committed transaction was also replicated to the target database, and thus, also "committed" in the target database. Thus, in case one or more write statements should precede the requested statement within the requested transaction, any changes imposed by said write statements are not replicated to the target database when the requested statement is executed on the target database. As a consequence, the result retrieved from the requested statement performed on the target database may differ from the result that would have been obtained if the requested statement would have been executed on the source database. This may result in a significant performance gain at the cost of standard conformity and accuracy as any changes imposed by the preceding statements may not be present in the target database when the statement is executed.

According to some embodiments, the source database is an OLTP database and the first type of database queries comprises INSERT statements, UPDATE statements, DELETE statements and/or index-based SELECT statements. The target database is an OLAP database and the second type of queries consists of SELECT statements that execute a non-index based sequential table-scan. Thus, executing write statements may be executable more efficiently on the source database and may always be dispatched to the source database for execution. This may also hold true for some SELECT queries. However, some more complex, analytical queries may be performed much more efficiently on the target database.

OLTP and OLAP databases are only one possible implementation of a source and a target database being optimized for efficiently processing different kinds of database queries. According to other embodiments, the source database and the target database may be implemented in any possible combination of two different ones of the following database types:

an OLAP database (i.e., a database suitable to handle complex data models for business management and statistics by supporting multidimensional queries that may allow consolidating data in real-time);

an OLTP database (i.e., a database allowing updating existing transactional information to reflect gathered and processed information on all transaction having been performed in a transactional data processing system; OLTP databases ensure atomicity by efficient concurrency controls in order to guarantee that all the steps in transaction are completed successfully as a group);

a graph database (i.e., a database optimized for the storage and retrieval of data organized as a graph comprising nodes and edges);

a triplestore (i.e., a database optimized for the storage and retrieval of subject-predicate-object triples);

a key-value pair based database (also referred to as "correlation database", i.e., a database designed to efficiently handle unplanned, ad hoc queries; it uses a value-based storage (VBS) architecture in which each unique data value is stored only once and an auto-generated indexing system allows efficient retrieval of all values);

a document store (i.e., a database designed for storing and allowing efficient retrieval of document-oriented information, also known as semi-structured data and is typically implemented as NoSQL database);

a row-oriented database (i.e., a database that stores data tables as sections of columns of data rather than as rows of data by serializing all of the values of a column together, then the values of the next column);

a column-oriented database (i.e., a database that stores data tables as sections of rows of data rather than as columns of data by serializing all of the values of a row together, then the values of the next row);

one or more individual tables organized in column-major order; and one or more individual tables organized in row major order.

Depending on the embodiment, the source database and the target database may be managed by the same DBMS supporting multiple types of queries or may be managed by two different DMBS.

According to embodiments the DBMS comprises a first database engine and a second database engine. The first database engine is configured for executing the first type of database queries on the source database and the second database engine is configured for executing the second type of database queries on the target database. Either the first database engine executes the requested statement on the data of the source database or the second database engine executes the requested statement on the data of the target database. Whether the statement is performed by the first or the second database engine (and thus, if the statement is performed on the source or the target database) is dynamically determined in dependence on the type of the requested and received statement. The decision may be made transparent to a client program having submitted the requested statement.

This may be advantageous as the client program does not have to take into account in advance by which engine the request will actually be processed. The query handling and dispatching is implemented by the DBMS, not the client program. This may ease interoperability of the DBMS with multiple different clients and the maintenance of the client application programs.

According to embodiments the delaying is implemented by the following steps: upon the DBMS deciding to dispatch the requested statement to the target database engine, the DBMS performs the identification of the current source commit log sequence number of the identified most recently committed transaction and assigning a transaction-ID of the transaction comprising the requested statement to the current source commit log sequence number. The DBMS supplements the request for the statement with the transaction-ID of the transaction that comprises said requested statement. In addition, the DBMS supplements the request with the identified most current replication commit log sequence number. Then, the second database engine queues the request until the DBMS determines that the identified most recently committed transaction has also committed in the target database. The assigned transaction-ID of the requested transaction and the transaction ID assigned to the identified most current replication commit log sequence number of the queued request may be evaluated for determining if the identified most recently committed transaction was already replicated to the target database or not.

According to some embodiments, the determination if the most recently committed transaction was already replicated to the target database may be implemented by comparing transaction-IDs of log sequence numbers of the source and target log whereby the log sequence numbers may be generated using WAL (write ahead log) technology. According to other embodiments, the DBMS, e.g. the target engine, may simply store and repeatedly update the source commit sequence number of the one of the transaction having been replicated to the target database most recently. Thus, also implementations may be used that do not dependent on the availability of a target log sequence number and may not even use the WAL technique. If a request for executing a statement is received by the DBMS that has a source commit number that is higher than the one that is currently stored by the DBMS as the source commit log sequence number of the most recently replicated transaction, the DBMS delays execution of said requested statement until the replication has caught up and the replication commit log sequence number LRSNB on the target is equal or higher than the log sequence number LRSNR generated when receiving the request.

According to embodiments, the DBMS automatically determines if the requested statement is of the first or of the second database query type. The DBMS supplements the received request with the identified most current source commit log sequence number and forwards the supplemented request to the second database engine only in case the requested statement is determined to be of the second type. This may further accelerate the request handling because the steps of supplementing the request with additional information is only performed in case the request is to be dispatched to the target database.

According to some embodiments, the DBMS stores transaction-IDs in association with the source commit log sequence numbers and the replication commit log sequence numbers to determine if any one of the transactions having committed in the source database was already replicated to the target database. Thus, source commit and the replication commit log sequence numbers reflecting a commit or replication event in the source or the target database are mapped and linked to each other by means of a transaction-ID of said transaction.

According to embodiments, each of the source commit log sequence numbers and each of the replication commit log sequence numbers has assigned a transaction-ID of the respectively committed transaction.

The source log may comprise a plurality of source commit log sequence numbers. Each source commit log sequence number has assigned a transaction-ID of the one of the transactions that committed at a source log record identified by said source commit log sequence number. The target log may comprise a plurality of replication commit log sequence numbers. Each replication commit log sequence number has assigned a transaction-ID of the one of the transactions that was successfully replicated to the target database at a target log record identified by said replication commit log sequence number.

Several approaches exist for determining if the (committed) data changes imposed by the identified most recently committed transaction were already replicated to the target database.

According to some embodiments, the determining if at the moment of evaluation the identified most recently committed transaction has been replicated to the target database comprises: the second database engine receives the identified current source commit log sequence number from the first database engine. The second database engine repeatedly searches the target log for identifying the identified transaction-ID assigned to the most current source commit log sequence number in the target log.

According to other embodiments, the determining if at the moment of evaluation the identified most recently committed transaction has also committed in the target database comprises: the first database engine repeatedly receives the identified most current replication commit log sequence number from the second database engine and compares the transaction-ID assigned to said received most current replication commit log sequence number with the transaction-ID assigned to the current source commit log sequence number. The second database engine executes the delay until the searching or the comparing identified a matching pair of transaction-IDs.

The order of the commit log sequence numbers in the source log reflects the chronological order of commit events of the transactions in the source database. The order of the replication commit log sequence numbers in the target log reflects the chronological order of committed replication events of the transactions in the target database. The asynchronously replicating of the transactions having committed in the source database is executed is executed in accordance with the order of the commit log sequence numbers of the source log.

Thus, the sequence (order and identity) of transactions committed at the source commit log sequence numbers is identical to the sequence of transactions committed at the target database (as indicated by the replication commit log sequence numbers which may have assigned the transaction-ID of the transaction that was replicated at said replication commit log sequence number in the target database).

According to embodiments, the DBMS executes the replication of the data changes in a batch-wise manner by:
a) compiling a batch, the batch comprising statements of one or more transactions that have been executed in the source database and have not yet been replicated to the target database, each of said one or more transactions corresponding to one of the source commit log sequence numbers;
b) grouping the statements of the batch into one or more commit groups, wherein all statements contained in any of the commit groups belong to a respective transaction that has already committed in the source database, wherein said commit groups are free of statements of non-committed transactions;
c) replicating the batch, thereby executing and committing all transactions in the one or more commit groups of the batch also in the target database in a single step;
d) upon having successfully replicated the batch, identifying the one transaction of a plurality of transactions in said batch that was replicated most recently to the target database; and using a log sequence number LSNB of one of the target log's log records that represents the moment of the successful replication of said identified transaction as the most current replication commit log sequence number;

e) repeating steps a)-d) zero, one or multiple times, thereby respectively updating the most current replication commit log sequence number.

Any transaction having committed in the source database and whose data changes were fully replicated to the target database is herein considered as a transaction having also "committed" in the target database irrespective of whether said transaction was replicated in a single-transaction-mode or batch replication mode. Executing the replication in batch mode accelerates the replication compared to a replication based on individually committing transactions. Thus, the delay time for executing the requested statement in the target database may be reduced.

According to embodiments, the DBMS or a replication module coupled to the DBMS may pool statements of previous batches of uncommitted transactions. Said pooled statements are not grouped in a commit group until the one or more transactions containing said pooled statements committed in the source database. Thus, said "ungroupable", pooled statements of uncommitted transactions may be collected over several cycles of creating and replicating batches and commit groups.

According to embodiments, delaying execution of the requested statement comprises repeating steps a)-d) one or multiple times, thereby respectively updating the most current replication commit log sequence number and comparing said updated most current replication commit log sequence number with the current source commit log sequence number. The DBMS delays execution of the requested statement until the repeated determination of the comparison indicates that the identified most recently committed transaction has also been replicated to the target database.

The receiving of the request may trigger execution of a batch update. According to embodiments, if at the moment of receiving the request the identified current source commit log sequence number has associated an identifier of a transaction that was not yet replicated to the target database, immediately executing steps a)-d) after receiving the request.

Thus, the replication of data changes may be triggered by the receipt of the request and by in addition determining that there exist at least some data changes imposed by committed transactions in the source database that have not yet been replicated to the target database. This may help reducing the delay time as a current batch of data changes is replicated in response to receiving the request. This may be earlier than the scheduled batch replication.

According to embodiments, the DBMS may evaluate the source log in combination with the replication commit log sequence number of the repeatedly identified most current replicated one of the transactions for determining if any data changes are currently contained in the source database that have not yet been replicated to the target database. In case the source database does not comprise said non-replicated changes, the DBMS may skip the delay step and automatically execute the requested statement in the target database. This may further accelerate the request execution. The source log file may already comprise information that is indicative of the time when the last write access to the source data occurred. Some DBMS keep record of log ranges where a certain table was modified to be able to speed up point-in-time recovery, i.e., skip over log ranges during recovery where there are no changes for the tables to be recovered. An example for this is SYSIBM.SYSLOGRX on DB2 for z/OS, where for every tablespace the log range where changes happened is recorded. Thus, the determination whether uncommitted data changes exist in the source database can be performed quickly based on readily available information.

The source log may continuously be updated with information indicating if any changes were applied to the source database. The same holds true for the target log for keeping track of any data changes of committed transactions having been successfully replicated to the target database.

According to embodiments, in addition to the request-triggered replication, the replication of the data changes may be executed independently of the receiving, delaying and/or executing of the received request in the source or the target database. This may be advantageous as the replication of the data changes is not delayed by the processing of the requested statement. Thus, there may exist a kind of "default" replication mechanism running in the background in addition to the request-driven replication.

According to embodiments, the DBMS receives and evaluates a parameter value; for example, said parameter value may be a DBMS environment parameter value and/or a parameter value received by the DBMS from a client application having submitted the request. In case said parameter value indicates that said client application requires receiving a result that reflects a state of the source database at a moment in time which is identical to or is more recent than the moment of receiving the request, the DBMS executes the delaying step as described above. Otherwise, the DBMS skips the delaying. For example, said parameter could be a database environment variable having the name MOST_RECENT_DATA. It can be set at the system, application or statement level. It may allow client applications to specify whether the access to the most recent committed data is required during query execution or not. An additional database environment variable WAIT_FOR_MOST_RECENT_DATA could be implemented by the DBMS. Said additional variable may allow applications to specify a timeout, i.e., a maximum time a requested statement can be delayed before an exception is raised. It can be set at the system, application or statement level.

Replication may be implemented as an asynchronous process. Therefore, there is a chance that the replication process may fall behind, e.g. due to resource constraints. For preventing a deadlock, the DBMS may automatically associate a predefined timeout value to each requested statement. Said timeout specifies the maximum amount of time the DBMS should wait until the condition ($LSN_B \geq LSN_R$) is satisfied for the given query. If the timeout value is reached, the database engine performing the requested statement on the target database (e.g. OLAP engine) communicates this condition to the database engine responsible for performing statements on the source database (e.g. OLTP engine). Here, it can be decided if the query should be executed again ("re-drive"), or if an error should be raised.

Replication of Uncommitted Changes Imposed by Preceding Statements of the Currently Requested Transaction According to embodiments, the DBMS identifies a requested transaction to which the requested statement belongs. After the delaying, the DBMS executes statements that precede the requested statement and that are contained in the identified requested transaction. The execution of the preceding statements and of the requested statement is performed in the target database in chronological order of said statements within the requested transaction. Executing the requested statement comprises reading data from the target database, whereby the read data also comprises changes imposed by the preceding statements. The DBMS returns the read data to the requestor, e.g. a client application running on a remote client device. After returning the read data, the DBMS undoes the data changes in the target database imposed by said preceding statements.

Performing the data changes of the preceding statements and then undoing said data changes may be advantageous as it ensures that the requested statement, when executed on the target database, "sees" also the changes imposed by the preceding statements of the requested transaction. Thus, the requested statement, when executed on the target database, will "see" the same data basis as it would see when executed on the source database. By undoing the data changes on the target database, it is ensured that the data content of the target database stays in sync with the data content of the source database also in case the requested transaction should be rolled back in the source database. If the requested transaction should finally be committed in the source database, its data changes may later be propagated to the target database by the asynchronous replication module. By executing the uncommitted changes of the preceding statements in the target database and then undoing said changes, it can be ensured that the requested statement can be executed in the target database with minimum delay time: the request is delayed until the identified most recently committed transaction was replicated to the target database, but request execution does not wait until the requested transaction or the preceding statements are replicated to the target database by the replication module.

Embodiments of the invention may be considered as proposing two new isolation levels, called "read other committed changes (ROCC)" and "read own writes (ROW)". The ROW isolation level, for example, is implemented by the embodiment depicted in FIG. 3A. The ROCC isolation level is implemented, for example, by the embodiment depicted in FIG. 4. The ROW isolation level provides a superset of the ROCC guarantees. Both new isolation levels provide a strict superset of the guarantees as defined by DB2's "cursor stability (CS)" isolation level (called read committed in the SQL standard).

FIG. 1 depicts an exemplary architecture of a database management system (DBMS) comprising a source database 122 and a target database 106. The DBMS and the two databases may be hosted by a database server 102. However, it is likewise possible that different servers are used for hosting the source and the target database. The database server 102 comprises a main memory 134 and a processor 132. A non-volatile storage medium 142 comprises instructions that may encode the DBMS and its modules. For example, the DBMS may comprise a replication module for asynchronously replicating changes applied in the source database to the target database. The source database may be an OLTP database configured for quickly performing write statements and some forms of read statements. The target database 106 may be an OLAP database that is operable to execute complex, analytical read queries efficiently. The source database 122 comprises some source data 120 that is modified by write statements performed on the source database (e.g. INSERT, UPDATE and DELETE statements). Said changes are replicated to the target database with a certain delay, for example, using delay module 114. Thus, the data content 112 of the target database is in fact a copy of the data 120 of the source database, whereby said copy may miss some current changes that have not been replicated yet. The dispatcher module 124 is operable to analyze any request T4S2, T4S5, T4S4 for executing a statement in order to determine if said requested statement is an OLTP-type statement or an OLAP-type statement. OLTP-type database queries specified e.g. by statements T4S2 and T4S5 are dispatched by the dispatcher 124 to the OLTP database engine 116 while OLAP-type database queries specified e.g. in statement T4S4 are dispatched ('offloaded') by the dispatcher 124 to the OLAP database engine 106.

Figure 2:
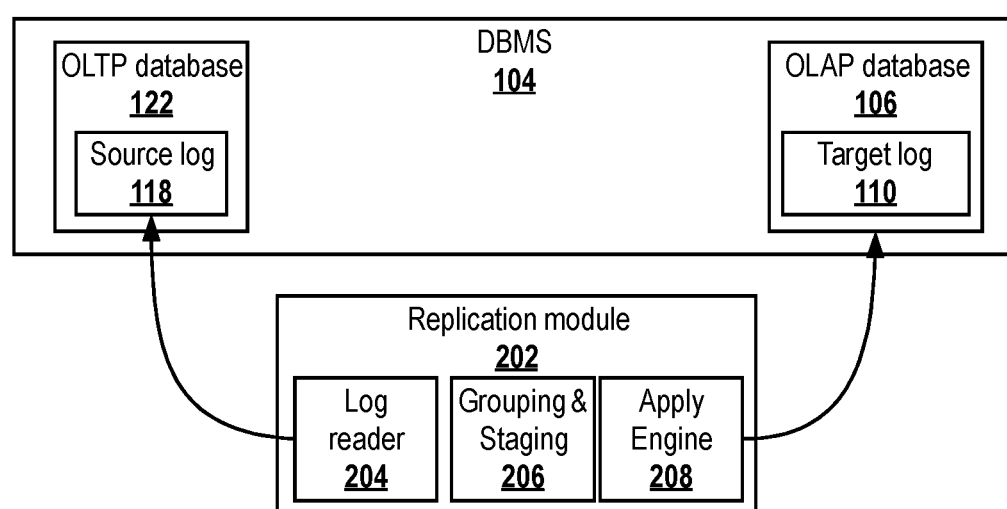
FIG. 2 is a block diagram of the DBMS and a replication module.

FIG. 2 is a block diagram of the DBMS and a replication module. The replication module 202 continuously replicates data stored in the source database to the target database by means of an asynchronous data replication protocol. A log reader module has access at least to the source log 118 for identifying log records and transaction identifiers associated with the log records. The module 206 is responsible for grouping multiple database statements that have already been performed in the source database to commit groups, if possible. The grouping is only possible if a particular transaction has committed in the source database. In this case, all statements of said committed transaction are grouped into one commit group and are staged for replication. The apply engine 208 executes all statements of the staged commit groups in the target database 106 and updates the target log 110 accordingly.

Figure 3A:
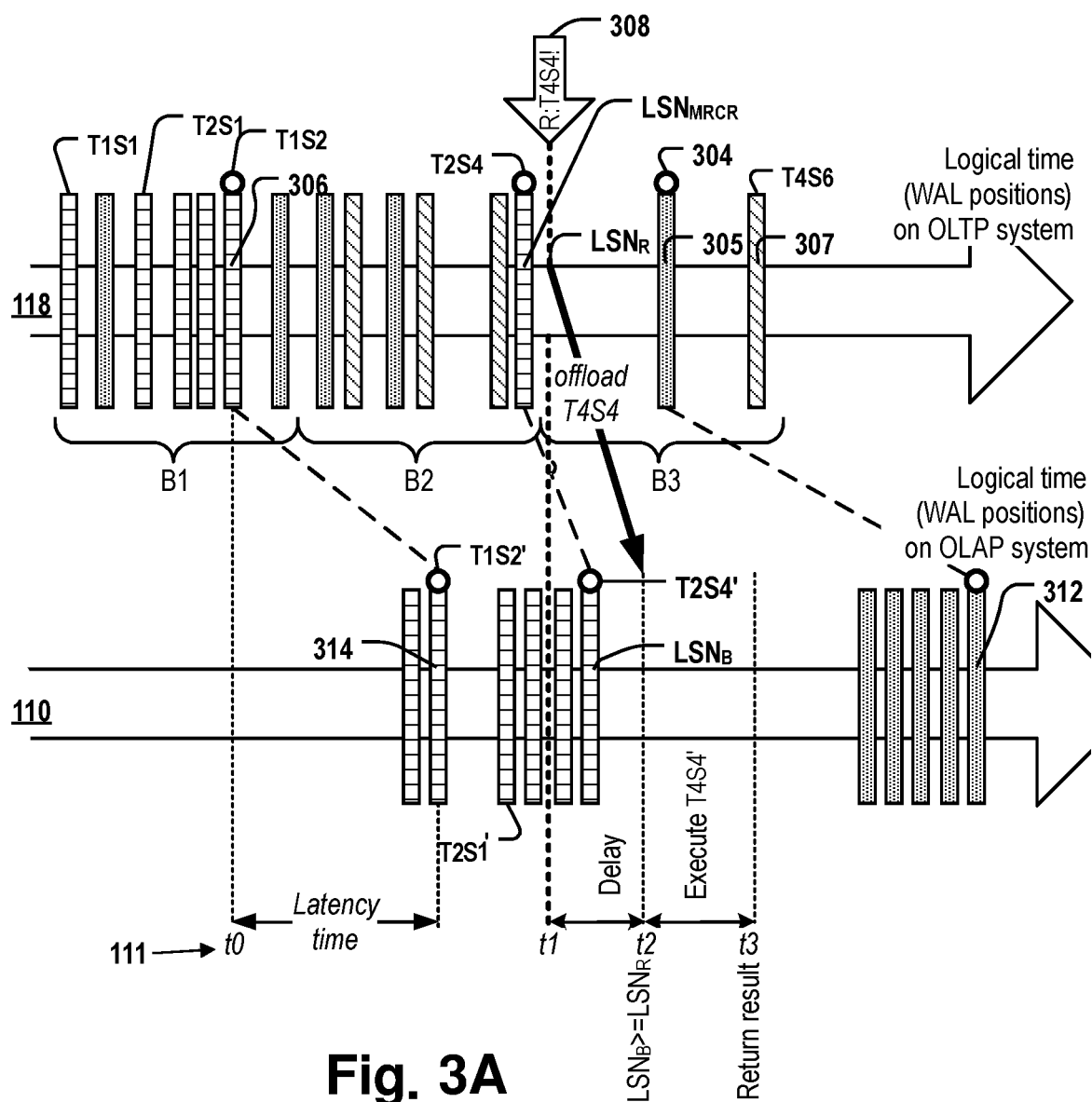
FIG. 3A is a functional schematic diagram which illustrates the replication of changes having already been committed in the source database when receiving the request.

FIG. 3A illustrates the replication of changes of transactions T1, T2 having already committed in the source database 122 at the moment when the DBMS 104 receives the request 308 for executing a particular statement T4S4 of a transaction T4. Time intervals are depicted using time notations 111 (t0, t1, t2 and t3) as shown in FIG. 3A.

Figure 3B:
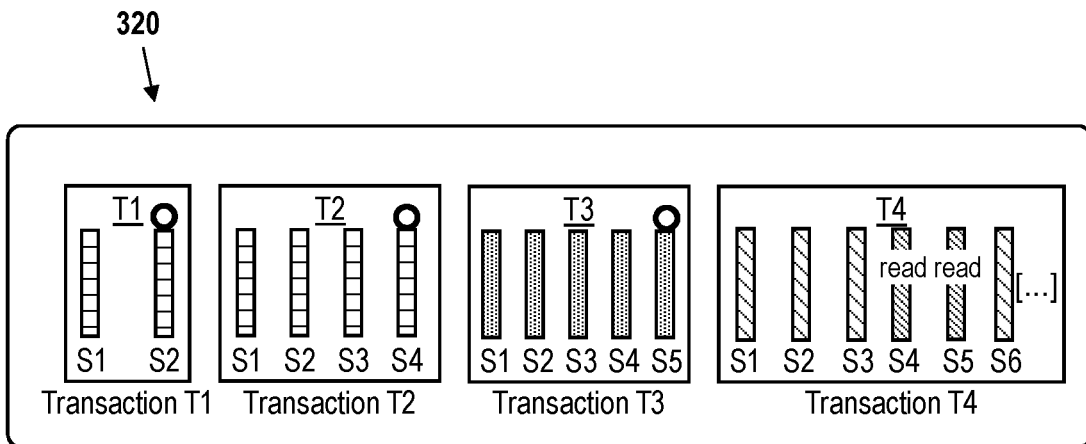
FIG. 3B is a block diagram which illustrates four transactions respectively comprising multiple statements.

The box 320 at FIG. 3B depicts four transactions T1-T4 respectively comprising multiple statements. For example, transaction T1 comprises statement S1 (or 'T1S1') and statement S2 (or 'T1S2'). Transaction T2 comprises four statements S1-S4 (or 'T2S1-T254'). A transaction may consist of one or more read statements (SELECT), one or more write statements (UPDATE, INSERT, DELETE), or a mixture of read and write statements. As only write statements result in a data change in the source database that needs to be replicated, the bars overlaying the source log and the target log in FIG. 3 all represent write statements. It is possible, however, that a transaction also comprises one or more read statements such as, for example, T4S4 and T4S5 which do not result in data changes in the source database that need to be replicated. Transaction T4 can also include statement S6 as T4S6 307. Each statement is represented in FIGS. 3A and 3B by a bar symbol. A statement that results in a commit event of its respective transaction (i.e., a 'commit statement') is indicated by a circle at the top of its respective bar symbol. As can be derived from FIGS. 3A and 3B, at the moment when the request is received, transactions T1 and T2 have already committed in the source database at source log sequence numbers 306 and $LSNM_{RCR}$. Transactions T3 and T4 are still ongoing when receiving the request 308. T3 will commit at commit statement T3S5 (corresponding to bar symbol 304) soon after the receipt of the request while it is unclear if and when T4 will commit at all.

The source log 118 comprises source commit log sequence number 306, $LSNM_{RCR}$, 305 respectively indicating a moment when one of said transactions T1, T2, T3 committed in the source database. The target log comprises replication commit log sequence numbers 314, $LSN_B$, 312 respectively indicating a moment when a respective one of said transactions was successfully replicated to the target database. A "commit event" or "replication event" of a transaction in the target database in respect to the replication commit log sequence number means that at a moment identified by said log sequence number all data changes of a transaction have been replicated to and are stored in the target database. It does not necessarily imply that the transaction committed individually in the target database, because the replication may be performed in batch mode.

The moment when the DBMS 104 receives the request 308 to perform a database statement T4S4 is represented in the source log by $LSN_R$. The $LSN_R$ may be attached to a request dispatched to the target database.

The DBMS identifies in the source log a current source commit log sequence number $LSN_{MRCR}$. The $LSN_{MRCR}$ indicates the commit event of one T2 of the transactions T1, T2, T3 which committed in the source database most recently before receiving the request: T1 (by commit statement T1S2) has committed before T2 (by commit statement T2S4). T3 and T4 have not committed at the moment of receiving the request. The execution of statements in the source database that belong to transactions that have not yet committed in the source database is not a "commit" of a transaction. Therefore, T2 is in the depicted example the "most recently committed transaction" in respect to the request 308. In other words, the identified current source commit log sequence number $LSNM_{RCR}$ is the log sequence number that indicates a log record at a commit event of a first one T2 of the transactions T1, T2, T3 which committed in the source database most recently before the receiving, at $LSN_R$, the request 308.

The DBMS repeatedly identifies 610 in the target log a most current replication commit log sequence number $LSN_B$, by repeatedly updating a source log and a target log 608 of a source database and of a target database, respectively. The most current replication commit log sequence number $LSN_B$ is indicative of the one of the transactions having been replicated most recently to the target database.

The one of the transactions having been replicated most recently to the target database may be determined repeatedly and the log sequence number "LSNB" may be updated in each determination step. Thus, LSNB is indicative of the one of the transactions having been replicated most recently to the target database at the moment when performing said determination and updating. The most current replication commit log sequence number LSNB may have assigned a transaction-ID of the one of the transactions (replication must apply in source commit order) that was most recently replicated to the target database as part of the last batch of changes. The transaction-IDs may be written to the target log when executing the replication.

The DBMS delays execution of the requested statement T4S4 in the target database until an evaluation of the identified current source commit log sequence number and of the repeatedly identified most current replication commit log sequence number returns that the identified most recently committed transaction T2 has been replicated to the target database.

FIG. 3 shows the logical time (LSN, WAL positions) on both the OLTP and the OLAP system and how changes are propagated by the asynchronous replication module 202. The replication module may evaluate the source log of the OLTP system, identify statements of committed transactions, and replicate the committed transactions individually or in batch mode to the target database. Replicating a committed transaction such as T1 to the target database involves some latency time that is defined as the time that passes between the point a change is visible on the source database (e.g. T1S2 for T1) and the point said change is visible also on the target database (e.g., T1S T1S2', T2S1', and T2S4'). The latency time usually has the range of one or more seconds or even less than a second.

When the dispatcher module 124 decides to offload a request to the database engine 108 of the target database, it associates the LSN representing the moment when the query entered the system ($LSN_R$) with the query (here: a query to execute statement T4S4), and then sends the request to the database engine 108. Here, the request is queued and delayed during time interval [t1-t2] until a scheduler is notified by the replication apply process that the registered $LSN_R$ has passed the current LSNB ($LSN_B>=LSN_R$). This means that all changes that have been committed before $LSN_R$ (T2 and all transactions having committed in the source database before T2) have been materialized on the target database. The request can now be scheduled for execution [t2-t3] and will see at least all data that has been committed on the source database at the moment of receiving the request.

If the replication is performed in batch mode, it may happen that a batch itself contains committed data with an LSN that is greater than $LSN_R$. In a further aspect, additional time may pass after a request has been scheduled for execution before it is actually being executed, e.g. in phases of high utilization. In this time, an additional batch of changes might have been applied to the target database. Thus, in fact, when executing the requested statement T4S4, it may actually "see" more data than the data that was contained at $LSN_R$ in the source database. However, no uncommitted changes, not even those made by other statements of the parent transaction T4 comprising the requested statement T4S4, are evaluated by the requested statement T4S4 in the embodiment depicted in FIGS. 3A and 3B.

At t3, the result set obtained for T4S4 is returned to the client application having submitted the request.

Multiple statements in the source log may be read by a log reader module 204 depicted in FIG. 2 in batches B1, B2, B3. Said statements may be pooled over multiple batches and used for creating and staging commit groups as described for FIG. 2.

Figure 4:
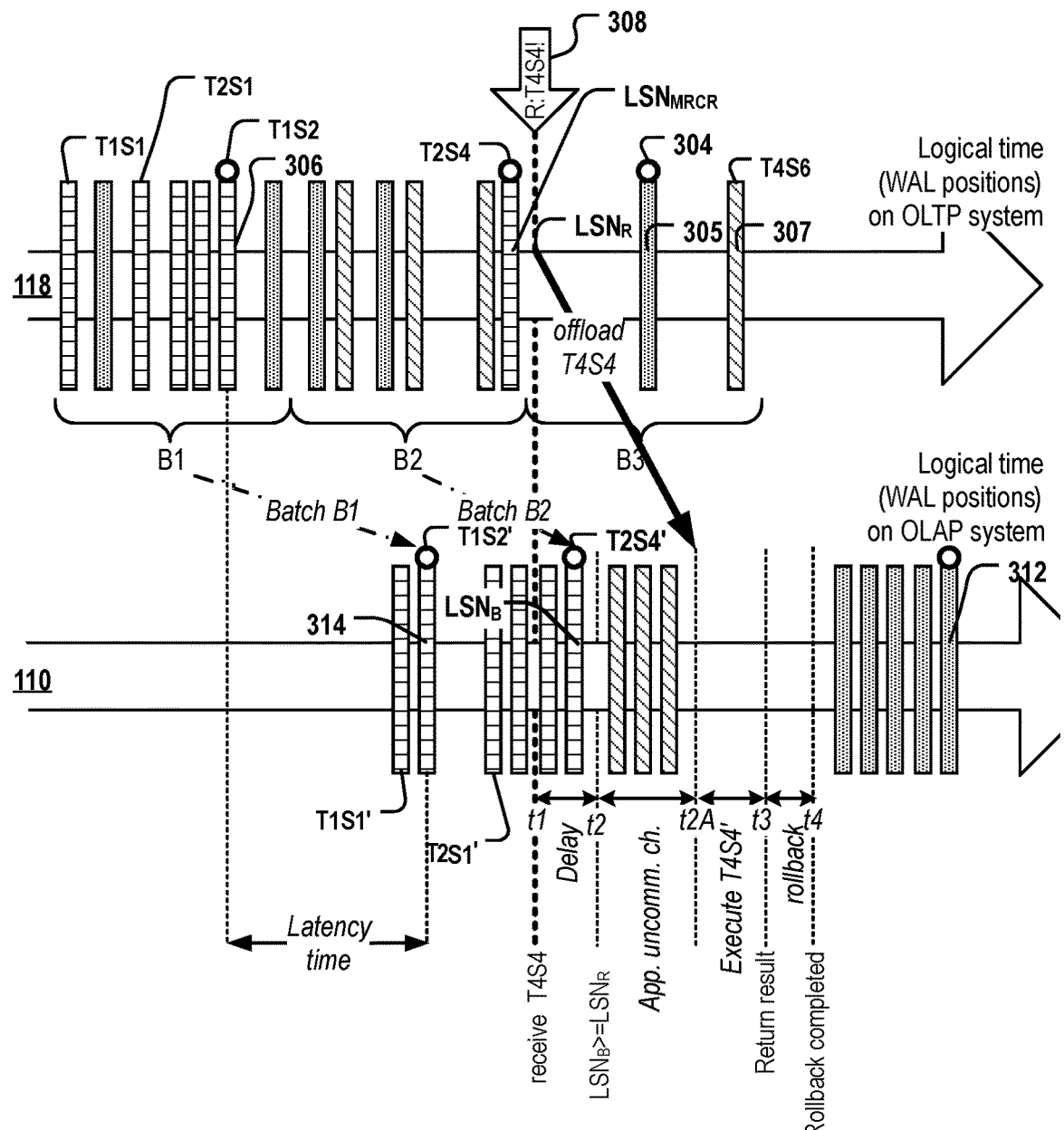
FIG. 4 illustrates, in addition to the replicated changes depicted in FIGS. 3A and 3B, the replication of uncommitted changes imposed by statements preceding a currently requested statement in a requested transaction.
Figure 5:
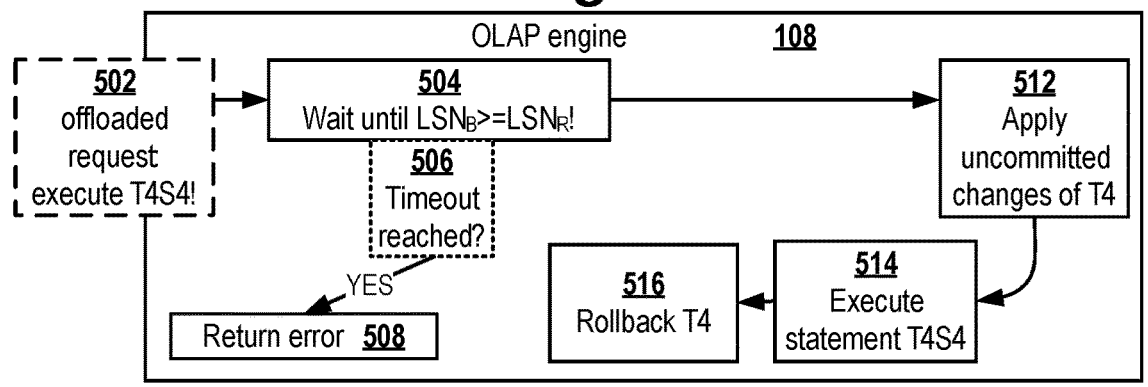
FIG. 5 is a block diagram of an OLAP engine.
Figure 6:
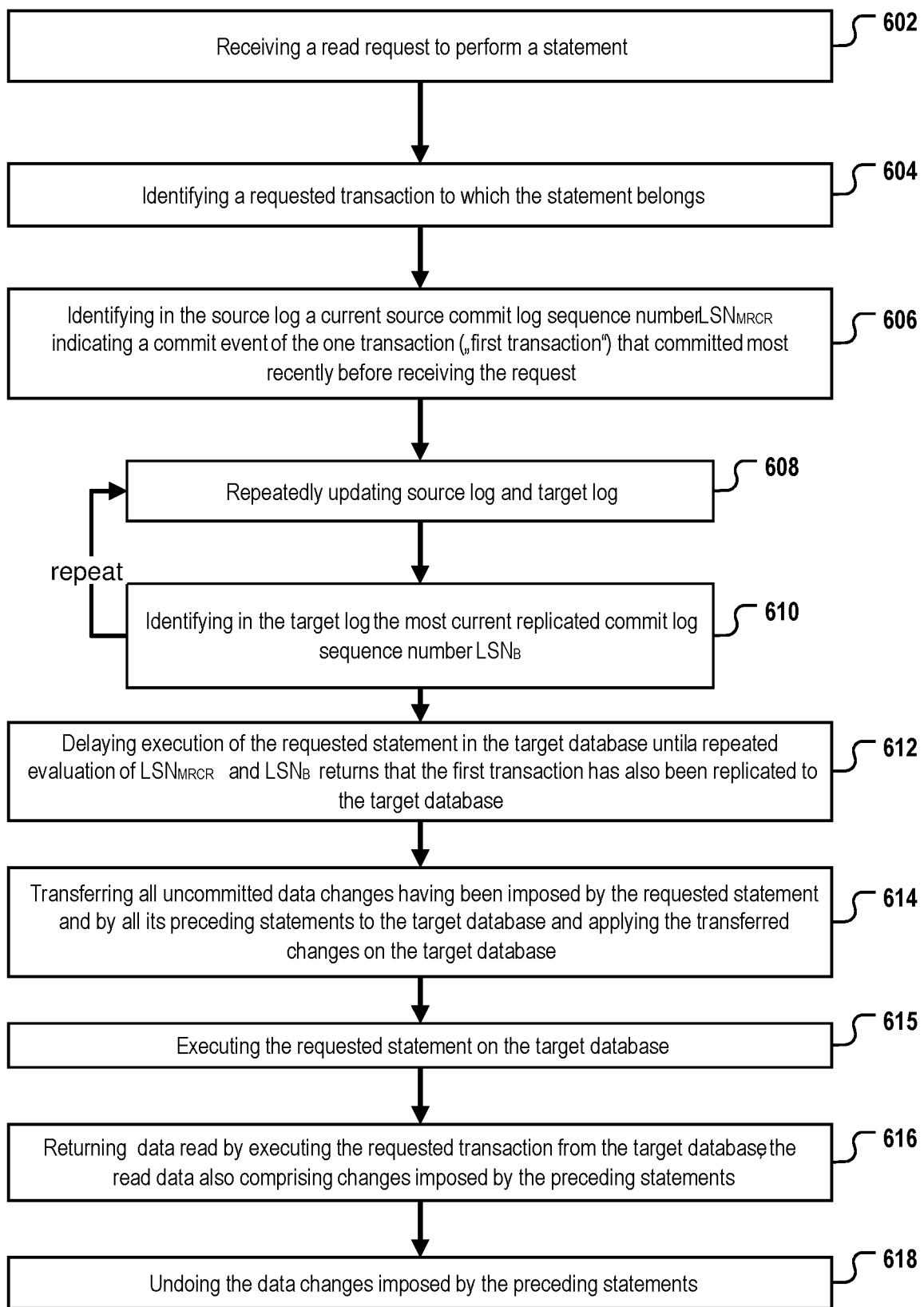
FIG. 6 is a flow chart of a method of operating a DBMS supporting efficient processing of multiple query types.

FIG. 4, FIG. 5 and FIG. 6 illustrate the replication of uncommitted changes imposed by statements preceding a currently requested statement T4S4 in a requested transaction T4 according to embodiments of the invention. Said changes may be replicated, according to some embodiments, in addition to the replicated changes of committed transactions described already for FIGS. 3A and 3B.

In the following, the replication of said uncommitted data changes of preceding statements of the requested transaction will be described by making reference to FIG. 4 and FIG. 6.

In respect to the replication of committed changes, the embodiment depicted in FIG. 4 corresponds to the embodiment described in FIGS. 3A and 3B. However, in case the OLAP engine or another database engine responsible for performing requests on the second database receives a request under the ROW protocol, the following steps are executed in order to ensure that also data changes imposed by preceding statements T4S1-T4S3 of the requested statement T4S4 are considered when executing the requested statement: a new transaction T4' is generated for execution on the target database. All uncommitted changes of preceding statements T4S1'-T4S3' of the transaction T4' in which context the requested statement T4S4' is running (i.e., statements of transaction T4 that have assigned an $LSN<LSN_R$) are scheduled at t1 for execution on the target database. After the delay period [t1-t2] expires, all changes imposed by said transaction having already committed at $LSN_R$ are replicated. At t2, the preceding statements T4S1'-T4S3' are executed on the target database for replicating the uncommitted changes in time period t2-t2A. Between time points t2A and t3, the requested statement T4S4' is executed in the target database and may also read some of the changes imposed by one of its preceding statements T4S1'-T4S3'. At moment t3, the result obtained for the requested statement will be returned and all data changes imposed by transaction T4 are rolled back in time period [t3-t4].

In one aspect, the invention relates to a computer-implemented method of operating a database management system 104. The DBMS comprises a source database 122 and a target database 106. The DBMS is configured for asynchronously replicating data changes of the source database to the target database. The method comprises:

the DBMS receiving 602 a request 308 to perform a statement T4S4, the requested statement being a database read statement;

the DBMS identifying 604 a requested transaction T4 to which the requested statement T4S4 belongs;

the DBMS repeatedly identifying the most recently committed one T2 of a plurality of transactions having been committed in the source database before receiving the request;

the DBMS delaying 612 execution of the requested statement T4S4 in the target database until the identified most recently committed transaction T2 has been replicated to the target database;

the DBMS after the delaying, transferring 614 all uncommitted data changes having been imposed by all statements T4S1, T4S2, T4S3 preceding the requested statement T4S4 and being contained in the identified requested transaction T4 from the source database to the target database; and applying the transferred changes also on the target database;

the DBMS executing 615 the requested statement T4S4 on the target database, thereby reading data from the target database, the read data also comprising at least some of the transferred data changes;

the DBMS returning 616 the read data;

after returning the read data, the DBMS undoing 618 the applied data changes in the target database which have been imposed by the preceding statements T4S1, T4S2, T4S3.

According to embodiments, the source database has assigned a source log 118 and the target database has assigned a target log 110. The method further comprises the DBMS identifying 606 in the source log a current source commit log sequence number $LSN_{MRCR}$, the current source commit log sequence number indicating a commit event of a first one T2 of the transactions T1, T2, T3 which committed in the source database most recently before the receiving $LSN_R$ of the request 308.

The DBMS performs the identifying of the most recently committed one T2 of the transactions by identifying, in the target log, a most current replication commit log sequence number $LSN_B$. The most current replication commit log sequence number $LSN_B$ is indicative of the most recently replicated one T2 of a plurality of transactions having been committed in the source database and having been replicated to the target database at the moment of evaluation. The DBMS determines if the identified most recently committed transaction T2 has been replicated to the target database by evaluating the identified current source commit log sequence number and the repeatedly identified most current replication commit log sequence number.

According to embodiments, the structure of the source database is optimized for a first type WT, RTI of database queries. The structure of the target database is optimized for a second type RTII of database queries, the second type differing from the first type of database queries.

According to embodiments, the DBMS executes, for each of the statements in the requested transaction T4:

the DBMS evaluating the statement for determining if said statement specifies a database query of the first type Wt, RTI or of the second type RTII;

in case said statement is determined to be of the first type, the DBMS dispatching the statement for execution to the source database, skipping the delay step and immediately executing the database query in the source database;

in case said statement is determined to be of the second type, the DBMS dispatching the statement for execution to the target database and performing the delaying and the delayed execution of the statement in the target database.

The DBMS may determine that the requested statement is of the second type and may, as a consequence, dispatch the requested statement to the target database.

According to embodiments, transferring the uncommitted data changes to the target database comprises executing 614 all uncommitted data changes imposed by the requested statement T4S4 and by all the preceding statements T4S1, T4S2, T4S3 of the requested statement also in the target database. Said execution is performed in the target database in chronological order, i.e., in accordance with the sequence of statements constituting the requested transaction T4.

Alternatively, transferring the uncommitted data changes comprises selectively identifying in the source database the uncommitted data changes imposed by the requested statement T4S4 and by all the preceding statements T4S1, T4S2, T4S3 of the requested statement; and using an existing data replication environment 202 for replicating the identified data changes to the target database.

According to embodiments the data changes imposed by the preceding statements T4S1, T4S2, T4S3 are transferred to and are applied in the target database irrespective of whether the statement imposing said changes is of the first database query type or the second database query type. For example, if a request for statement T4S2 is received and T4S2 is an OLTP type query, a request for executing T4S2 will not be dispatched to the OLAP engine. If, however, a request for T4S4 is received and T4S4 is an OLAP type query, all preceding statements T4S1-T4S3 are executed on the target database to ensure data consistency in respect to the execution of T4S3. Thus, if the requested statement is dispatched for execution to the target database, at least all statements preceding said requested statement within its transaction may also be dispatched for execution on the target database before the requested statement is executed on the target database. Thus, the dispatching of the preceding statements may depend on whether the requested statement is dispatched for execution to the target database or not.

According to embodiments the source database is an OLTP database and the first type of database queries comprises INSERT statements, UPDATE statements, DELETE statements and/or index-based SELECT statements. The target database may be an OLAP database and the second type of queries consists of SELECT statements that execute a non-index based sequential table-scan.

There are several optimizations that are possible for the embodiment depicted in FIG. 4.

According to embodiments, the method further comprises:

automatically flagging any transaction to be processed by the DBMS as 'READ ONLY' if said transaction solely comprises read statements; a 'READ ONLY' transaction is, for example, a transaction solely comprising SQL SELECT statements but no UPDATE, INSERT or DELETE statement;

the DBMS evaluating the requested transaction T4 for identifying if the requested transaction is flagged as 'READ ONLY';

if the requested transaction T4 is flagged as 'READ ONLY', executing the requested statement T4S4 in the target database immediately after the identified most recently committed transaction T2 committed $LSN_B$ in the target database, thereby skipping execution of any one of the previous statements T4S1, T4S2, T4S3 of the requested transaction T4;

if the requested transaction is not flagged as 'READ ONLY', performing the executing of the statements T4S1, T4S2, T4S3 preceding the requested statement T4S4.

This may accelerate the performance of the requested statement T4S4. In addition, as the statement T4S4 is ensured not to miss any uncommitted changes, the state of the DBMS when executing the READ-ONLY transaction as described above may operate in compliance with isolation level "Cursor stability".

According to embodiments, the method further comprises:

evaluating the source log in combination with the most current replication commit log sequence number for determining if any data changes are currently contained in the source database that have not yet been replicated to the target database;

in case the source database does not comprise said non-replicated changes, skipping the delay step and automatically executing the requested statement in the target database.

Skipping the delay in the absence of data changes on the source database between $LSN_B$ and $LSN_R$ may help reducing processing time. For example, SYSIBM.SYSLOGRX on DB2 for z/OS may automatically record, for every tablespace, the log range where changes happened. Said existing information may be used for skipping over log ranges where there are no changes for the tables to be replicated.

According to embodiments the undoing is implemented by an undo-command. After having executed the requested statement in the target database, the DBMS delays the undoing until one of the following events occurs:

a predefined timeout lapses since the moment of having executed the requested statement T4S4;

the requested transaction T4 is rolled back in the source database;

the requested transaction committed in the source database, whereby in case the requested transaction committed in the source database, the method comprises deleting the undoing command for cancelling the undoing.

According to embodiments the DBMS receives and evaluates a parameter value that specifies a required isolation level for the requested statement. Only in case said parameter value indicates that isolation level "CURSOR STABILITY" is required, the DBMS performs the execution of the preceding statements in the target database. Otherwise, the DBMS selectively executes the requested statement in the target database irrespective of whether changes imposed by any one of the preceding statements were already replicated to the target database or not.

In a further aspect, the invention relates to a computer-readable medium 142 comprising machine executable instructions for execution by one or more processors 132, wherein execution of the instructions causes the one or more processors to execute the steps of any one of the previous embodiments.

In a further aspect, the invention relates to a DBMS 104 configured for executing the method according to any one of the above described embodiments.

FIG. 5 is a block diagram of an OLAP engine. Write requests and OLTP read requests are executed by the OLTP engine depicted in FIG. 1. The OLAP read requests are dispatched to and received 502 by the OLAP engine and are executed there (represented as T4S4!). The DBMS can control 504 whether the dispatched request is executed immediately without any wait or is delayed until all the data that was committed in the OLTP system before or at the time the request entered the DBMS has been replicated to the OLAP database (represented by $LSN_B >= LSN_R$!). In the latter case the DBMS can also control for how long the query execution is delayed 506 before an exception is raised in step 508 and the client application having submitted the request 308 is notified that the query cannot be started in the given time. The execution of T4S4 is only delayed in the target database if the most recent committed data is required by the client. Otherwise, T4S4 may be executed immediately on the target database. In step 512, the data changes of the preceding statements T4S1-T4S3 of the uncommitted requested transaction T4 are performed on the source database. Then, the requested statement T4S4 is executed on the target database in step 514 and may also read some of the data changes imposed by T4S1-T4S3. Then, in step 516, at least all changes imposed by statements T4S1-T4S4 are undone in the target database.

Thereby, with reference to the above detailed description, the present disclosure relates to a DBMS comprising a source database 122 and a target database 106. The DBMS is configured for:

asynchronously replicating data changes of the source database to the target database;

receiving a request 308 to perform a database statement (T4S4);

identifying a most recently committed one (T2) of a plurality of transactions (T1, T2, T3) which committed in the source database before receiving ($LSN_R$) the request 308;

repeatedly determining if the identified most recently committed one transaction was replicated to the target database;

delaying execution of the requested statement (T4S4) in the target database until the evaluation returns that the first transaction (T2) has also been replicated to and has committed in the target database; and after the delaying, executing the requested statement (T4S4) in the target database.

Referring to the present disclosure, it is an objective of embodiments of the invention to provide for an improved database management system, a method for operating the same and for a corresponding storage medium. Said objective is solved by the subject matter of the independent claims. Advantageous embodiments are described in the dependent claims. Embodiments described herein can be freely combined with each other if they are not mutually exclusive.

In one aspect, the invention relates to a computer-implemented method of operating a database management system (DBMS). The DBMS comprises a source database and a target database. The DBMS is configured for asynchronously replicating data changes of the source database to the target database. The method comprises:

the DBMS receiving a request to perform a statement, the statement being a database statement;

the DBMS identifying the most recently committed one of a plurality of transactions having been committed in the source database before the receiving of the request;

the DBMS repeatedly identifying the one of the plurality of transactions having been replicated most recently to the target database;

the DBMS delaying execution of the requested statement in the target database until an evaluation of the repeatedly identified most recently replicated transaction returns that the identified most recently committed transaction has been replicated to the target database;

after the delaying, the DBMS executing the requested statement in the target database.

According to embodiments, the source database has assigned a source log and the target database has assigned a target log. The identification of the most recently committed transaction comprises analyzing the source log, the source log comprising source commit log sequence numbers respectively indicating a commit event of one of the plurality of committed transactions. The repeated identification of the most recently replicated transaction comprises repeatedly analyzing the target log, the target log comprising replication commit log sequence numbers respectively indicating a moment when one of the transactions having committed in the source database were replicated to the target database. The evaluation of the repeatedly identified most recently replicated transaction comprises comparing the source commit log sequence numbers of the identified most recently committed transaction with the repeatedly identified replication commit log sequence numbers.

In another aspect, the invention relates to a computer-readable storage medium comprising machine executable instructions for execution by one or more processors. Execution of the instructions causes the one or more processors to execute the steps of any one of the embodiments described herein.

In another aspect, the invention relates to a DBMS comprising a source database and a target database. The DBMS is configured for asynchronously replicating data changes of the source database to the target database. The DBMS is configured for:

receiving a request to perform a statement, the statement being a database statement;

identifying the most recently committed one of a plurality of transactions having been committed in the source database before the receiving of the request;

repeatedly identifying the one of the plurality of transactions having been replicated most recently to the target database;

delaying execution of the requested statement in the target database until an evaluation of the repeatedly identified most recently replicated transaction returns that the identified most recently committed transaction has been replicated to the target database; and after the delaying, executing the requested statement in the target database.

In another aspect, the invention relates to a computer-implemented method of operating a database management system. The DBMS comprises a source database and a target database. The DBMS is configured for asynchronously replicating data changes of the source database to the target database. The method comprises:

the DBMS receiving a request to perform a statement, the requested statement being a database read statement;

the DBMS identifying a requested transaction to which the requested statement belongs;

the DBMS identifying the most recently committed one of a plurality of transactions having been committed in the source database;

the DBMS delaying execution of the requested statement in the target database until the identified most recently committed transaction has been replicated to the target database;

the DBMS after the delaying, transferring all uncommitted data changes having been imposed by all statements preceding the requested statement and being contained in the identified requested transaction from the source database to the target database; and applying the transferred changes also on the target database;

the DBMS executing the requested statement on the target database, thereby reading data from the target database, the read data also comprising at least some of the transferred data changes;

the DBMS returning the read data;

after returning the read data, the DBMS undoing the applied data changes in the target database which have been imposed by the preceding statements.

Referring to the embodiment of the present disclosure, the steps described can be executed using a computer-readable storage medium (142) comprising machine executable instructions for execution by one or more processors (132), wherein execution of the instructions causes the one or more processors to execute the steps of the embodiments described in the present disclosure.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor.

'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems.

Computer executable instructions may comprise machine executable instructions or a program which causes a processor to perform an aspect of the present invention. Said instructions may be written in any combination of one or more programming languages, including an object oriented programming language such as Java, Smalltalk, C++ or the like and conventional procedural programming languages, such as the "C" programming language or similar programming languages and compiled into machine executable instructions.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. The amount of processing resources may indicate the use degree of each of the physical components such as CPU, memory, and N/W bandwidth included in the computer system and their money cost. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

The invention claimed is:

1. A computer-implemented method for operating a database management system configured for asynchronously replicating data changes of a source database to a target database, comprising:

receiving a request to perform a statement at a database management system, the statement being a database statement;

identifying the most recently committed one of a plurality of transactions having been committed in a source database before the receiving of the request, using the database management system;

repeatedly identifying the one of the plurality of transactions having been replicated most recently to a target database, using the database management system;

delaying execution of the requested statement in the target database until an evaluation of the repeatedly identified most recently replicated transaction returns that the identified most recently committed transaction has been replicated to the target database, using the database management system;

after the delaying execution, using the database management system;

the source database assigns a source log and the target database assigns a target log;

the identification of the most recently committed transaction comprises analyzing the source log, the source log comprising source commit log sequence numbers (LSN) respectively indicating a commit event of one of the plurality of committed transactions;

the repeated identification of the most recently replicated transaction comprises repeatedly analyzing the target log, the target log comprising replication commit log sequence numbers respectively indicating a moment when one of the transactions having committed in the source database were replicated to the target database; and the evaluation of the repeatedly identified most recently replicated transaction comprises comparing the source commit log sequence numbers of the identified most recently committed transaction with the repeatedly identified replication commit log sequence numbers;

the database management system executes the replication of the data changes in a batch-wise manner by:

compiling a batch, the batch comprising statements of one or more transactions that have been executed in the source database and have not yet been replicated to the target database, each of said one or more transactions corresponding to one of the source commit log sequence numbers;

grouping the statements of the batch into one or more commit groups, wherein all statements contained in any of the commit groups belong to the same transaction having already committed in the source database, wherein said commit groups are free of statements of non-committed transactions;

replicating the batch, thereby executing and committing all transactions in the one or more commit groups of the batch also in the target database in a single transaction mode;

upon having successfully replicated the batch, identifying the one transaction of a plurality of transactions in said batch that was replicated most recently to the target database; and using a log sequence number LSNB of one of the target log's log records that represents the moment of the successful replication of said identified transaction as the most current replication commit log sequence number; and repeating the compiling of the batch, the grouping of the statements, the replicating of the batch, and the identifying of the one transaction of the plurality of the transactions for a defined amount of iterations, thereby respectively updating the current replication commit log sequence number.

2. The method of claim 1, wherein:

the delaying is implemented by:

upon the database management system deciding to dispatch the requested statement to the target database engine, the database management system performing the identifying of the current source commit log sequence number of the identified most recently committed transaction and assigning a transaction-ID of the transaction comprising the requested statement to said identified current source commit log sequence number; and the method further comprising:

supplementing the request to perform the statement with the transaction-ID of the transaction comprising said statement and with the identified current source commit log sequence number; and a second database engine queuing the request until the determining that the identified most recently committed transaction was replicated to the target database.

3. The method of claim 1, wherein:

the source log comprises a plurality of source commit log sequence numbers, each source commit log sequence number having assigned a transaction-ID of the one of the transactions that committed at a source log record identified by said source commit log sequence number;

wherein the target log comprises a plurality of replication commit log sequence numbers, each replication commit log sequence number having assigned a transaction-ID of the one of the transactions that was successfully replicated to the target database at a target log record identified by said replication commit log sequence number;

wherein the determining if the identified most recently committed transaction has been replicated to the target database comprises:

a second database engine receiving the identified current source commit log sequence number from a first database engine; and the second database engine repeatedly searching the target log for identifying the transaction-ID assigned to the identified current source commit log sequence number in the target log; or the first database engine repeatedly receiving the identified most current replication commit log sequence number from the second database engine and comparing the transaction-ID assigned to said received most current replication commit log sequence number with the transaction-ID assigned to the identified current source commit log sequence number;

the second database engine executing the delay until the searching or the comparing identifies a matching pair of transaction-IDs.

4. The method of claim 3, wherein:

the order of the commit log sequence numbers in the source log reflects the chronological order of commit events of the transactions in the source database;

wherein the order of the replication commit log sequence numbers in the target log reflects the chronological order of committed replication events of the transactions in the target database; and wherein the asynchronously replicating of the transactions having committed in the source database is executed in accordance with the order of the commit log sequence numbers of the source log.

5. The method of claim 1, wherein:

when the receiving of the request occurs, the identified current source commit log sequence number has associated an identifier of a transaction that was not yet replicated to the target database, repeating the compiling of the batch, the grouping of the statements, the replicating of the batch, and the identifying of the one transaction of the plurality of the transactions for a defined amount of iterations, after receiving the request.

6. The method of claim 1, further comprising:

evaluating the source log in combination with the replication commit log sequence number of the repeatedly identified most current replicated one of the transactions for determining if any data changes are currently contained in the source database that have not yet been replicated to the target database;

when the source database does not comprise said non-replicated changes, automatically executing the requested statement in the target database.

7. The method of claim 1, further comprising:

the database management system receiving and evaluating a parameter value;

in case said parameter value indicates that a client application having submitted the request requires to receive a result that reflects a state of the source database at a moment in time which is identical to or is more recent than the moment of receiving the request, executing the delaying.

8. A database management system comprising:

a source database;

a target database;

a database management computer system for operating a database management system, the computer system comprising:

one or more computer processors, one or more non-transitory computer-readable storage media, and program instructions stored on one or more of the non-transitory computer-readable storage media being executable by at least one of the one or more processors to:

asynchronously replicate data changes of the source database to the target database;

receive a request to perform a statement, the statement being a database statement;

identify the most recently committed one of a plurality of transactions having been committed in the source database before the receiving of the request;

repeatedly identify the one of the plurality of transactions having been replicated most recently to the target database;

delay execution of the requested statement in the target database until an evaluation of the repeatedly identified most recently replicated transaction returns that the identified most recently committed transaction has been replicated to the target database;

the source database assigns a source log and the target database assigns a target log;

the identification of the most recently committed transaction comprises analyzing the source log, the source log comprising source commit log sequence numbers (LSN) respectively indicating a commit event of one of the plurality of committed transactions;

the repeated identification of the most recently replicated transaction comprises repeatedly analyzing the target log, the target log comprising replication commit log sequence numbers respectively indicating a moment when one of the transactions having committed in the source database were replicated to the target database; and the evaluation of the repeatedly identified most recently replicated transaction comprises comparing the source commit log sequence numbers of the identified most recently committed transaction with the repeatedly identified replication commit log sequence numbers;

the database management system executes the replication of the data changes in a batch-wise manner by:

compiling a batch, the batch comprising statements of one or more transactions that have been executed in the source database and have not yet been replicated to the target database, each of said one or more transactions corresponding to one of the source commit log sequence numbers;

grouping the statements of the batch into one or more commit groups, wherein all statements contained in any of the commit groups belong to the same transaction having already committed in the source database, wherein said commit groups are free of statements of non-committed transactions;

replicating the batch, thereby executing and committing all transactions in the one or more commit groups of the batch also in the target database in a single transaction mode;

upon having successfully replicated the batch, identifying the one transaction of a plurality of transactions in said batch that was replicated most recently to the target database; and using a log sequence number LSNB of one of the target log's log records that represents the moment of the successful replication of said identified transaction as the most current replication commit log sequence number; and repeating the compiling of the batch, the grouping of the statements, the replicating of the batch, and the identifying of the one transaction of the plurality of the transactions for a defined amount of iterations, thereby respectively updating the current replication commit log sequence number.

* * * * *